Figure 1:
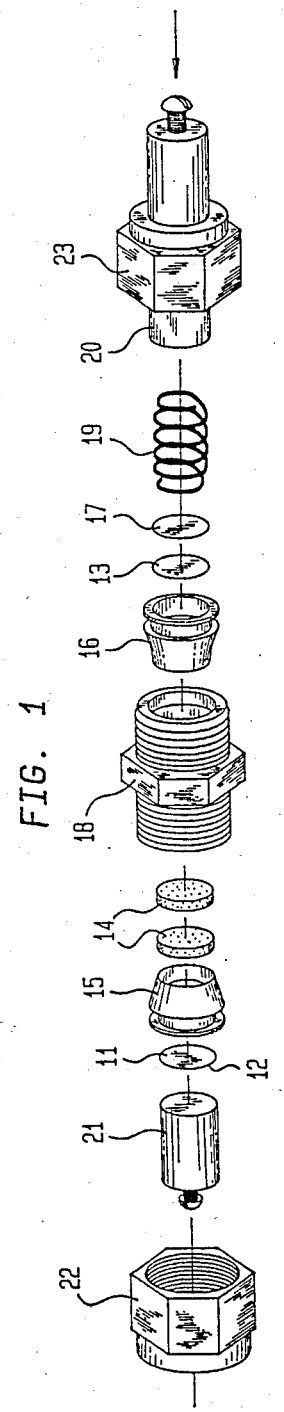

United States Patent [19]

Tarascon

[11] Patent Number: 4,604,334
[45] Date of Patent: Aug. 5, 1986

[54] $Mo_6Se_6$ SOLID STATE ELECTRODE FOR SECONDARY LITHIUM BATTERIES

[75] Inventor: Jean-Marie Tarascon, Millington, N.J.

[73] Assignee: Bell Communications Research, Inc., Livingston, N.J.

[21] Appl. No.: 792,962

[22] Filed: Oct. 30, 1985

[51] Int. Cl.$^4$ .................... H01M 6/16; H01M 4/36
[52] U.S. Cl. .................................. 429/194; 429/218
[58] Field of Search ............... 429/194, 191, 195, 197, 429/218

[56] References Cited

U.S. PATENT DOCUMENTS 3,791,867  2/1974  Broadhead et al. ............. 429/194
4,118,550  10/1978  Koch .................................. 429/194
4,377,624  3/1983  Joshi et al. ......................... 429/191

OTHER PUBLICATIONS

Jean-Marie Tarascon and G. W. Hull, "A Facile Synthesis of Pseudo One-Monodimensional Ternary Molybdenum Chalcogenides $M_2Mo_6X_6$ (X=Se,Te; M=Li,Na ... Cs)," *Materials Research Bulletin*, vol. 19, Pergamon Press, New York, 1984, pp. 915–924.

*Primary Examiner*—Donald L. Walton
*Attorney, Agent, or Firm*—James W. Falk; Edward M. Fink

[57] ABSTRACT

A non-aqueous battery is described which employs a molybdenum dichalcogenide negative electrode and a positive electrode of the formula $Li_xMo_6Se_6$ wherein x represents an integer ranging from 0.5 to 9.

6 Claims, 4 Drawing Figures

$Mo_6Se_6$ SOLID STATE ELECTRODE FOR SECONDARY LITHIUM BATTERIES

This invention relates to secondary lithium batteries. More particularly, the present invention relates to secondary lithium batteries which utilize a molybdenum selenide solid state electrode material both as the cathode and anode.

During the past decade, the demand for high energy storage devices has generated considerable interest in the study of secondary rechargeable batteries and has led to the discovery of promising battery systems including ambient temperature lithium cells. Unfortunately, the practical utilization of such systems has never been realized, such being attributed to limitations imposed by electrode characteristics, namely the absence of suitable cathode materials as well as the likelihood of dendritic regrowth of lithium on anode surfaces which results in short circuiting of the cell after several cycles.

More recently, workers in the art have obviated the cathode limitation by the discovery of a new class of solid state electrode materials, namely, the transition metal dichalcogenides such as $TiS_2$ and $VS_2$. These materials evidence an open layered structure and may conveniently accommodate lithium reversibly, that is, the lithium may enter the structure and be readily removed therefrom. This mechanism which is referred to as an intercalation reaction is not limited to the layered structure referred to but also is applicable to three dimensional structures having large open channels as found in $V_6O_{13}$ and in the Chevrel phases. Despite the availability of these materials, commercial application has not been attained because of the limited cycling life of the lithium anode.

In accordance with the present invention, the foregoing prior art limitations have been effectively eliminated by the chemical and electrochemical insertion of lithium into $Mo_6Se_6$. Specifically, it has been determined that $Li_xMo_6Se_6$ anodes may be prepared by electrochemical fabrication of a cell comprising Li metal as the anode and $Mo_6Se_6$ as the cathode, x representing an integer from 0.5 to 9. Once $Li_xMo_6Se_6$ has been prepared, it may be removed and made the anode of a secondary cell.

Figure 3:
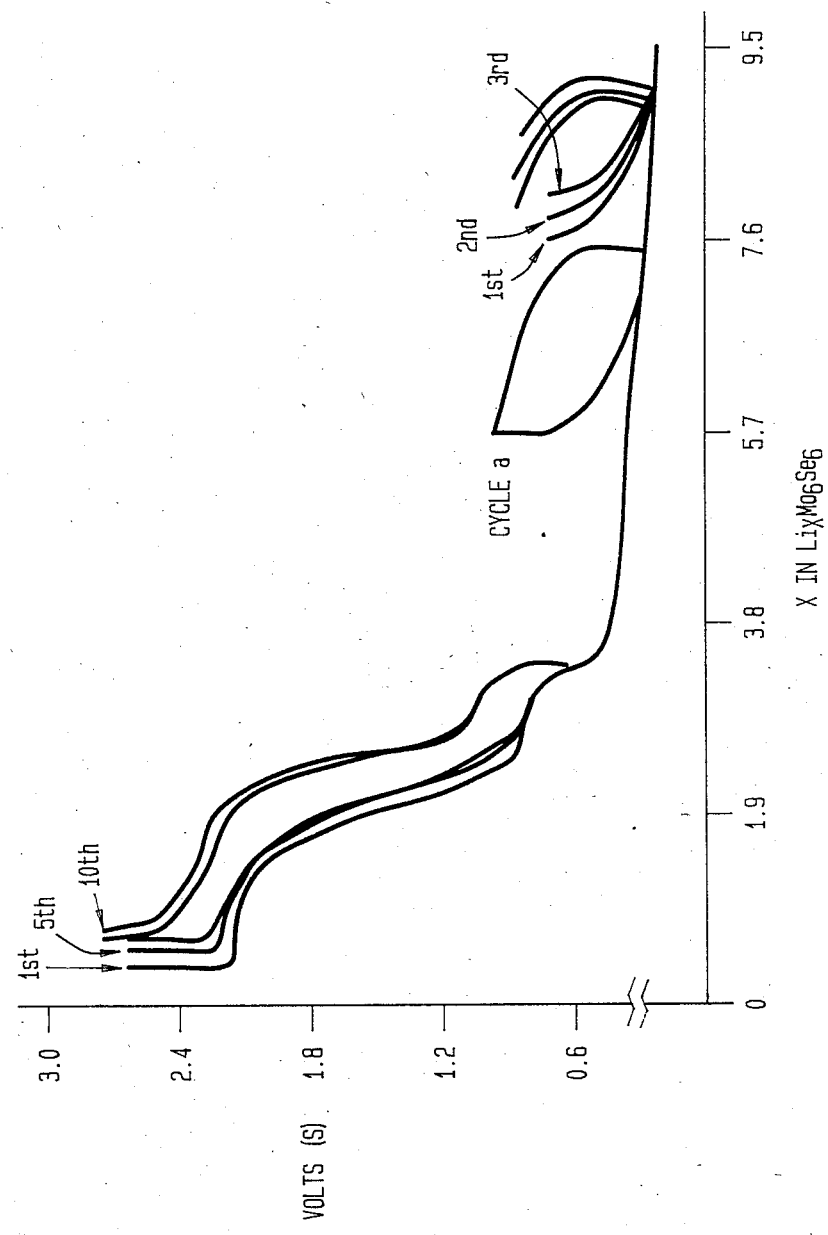
Figure 4:
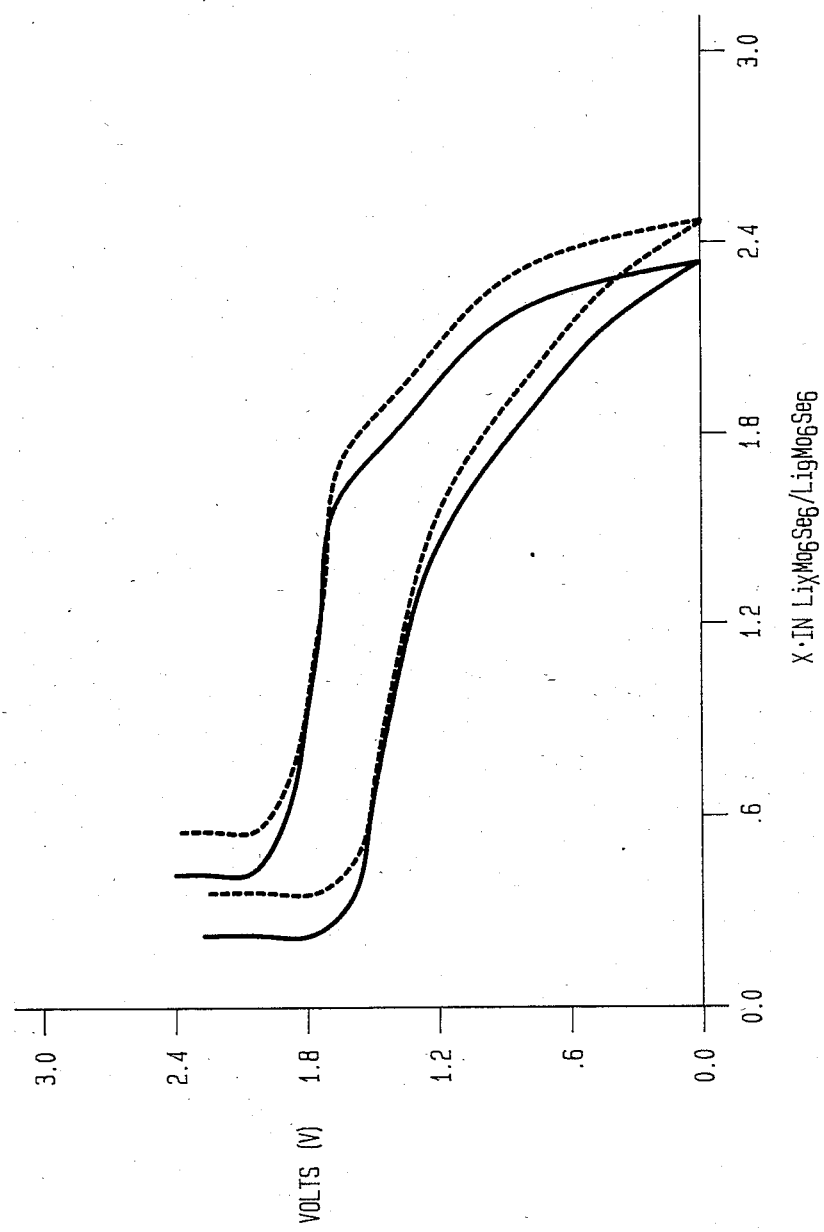

The invention will be more fully understood by reference to the following detailed description taken in conjunction with the accompanying drawing wherein:

FIG. 1 is an exploded view of a non-aqueous secondary lithium cell in accordance with the invention;

FIGS. 2(a) through 2(d) are graphical representations on coordinates of lithium atoms (x) in $Li_xMo_6Se_6$ against voltage showing the cycling characteristics of lithiated $Mo_6Se_6$ at a current density of 1.0 mA/cm$^2$ with known amounts of pure $Mo_6Se_6$;

FIG. 3 is a graphical representation on coordinates of lithium atoms (x) in $Li_xMo_6Se_6$ against voltage in volts showing the reversibility of the $Li_xMo_6Se_6$ system during 10 cycles at varying voltage, charging and discharging being effected at 1.5 mA/cm$^2$; and FIG. 4 is a graphical representation on coordinates of lithium atoms (x) in $Li_xMo_6Se_6/Li_9Mo_6Se_6$ against voltage in volts showing the reversibility of a cell including a $Li_xMo_6Se_6$ cathode and $Li_9Mo_6Se_6$ cathode during the 9th and 10th cycles of cycling at a current density of 1 mA/cm$^2$.

With reference now more particularly to FIG. 1, there is shown an exploded view of a typical secondary lithium battery of the invention. Shown is cathode 11, in powder form, disposed upon stainless steel disc 12, anode 13 and filter paper 14 which has been soaked in a suitable electrolyte such as $LiAsF_6$ in 2 methyl tetrahydrofuran. The structure also includes polypropylene fittings 15 and 16, steel disc 17, fitting 18, spring 19, plunger 20, stainless steel rod 21 and cap screws 22 and 23. The fittings, when compressed, provide an air tight ambient for the described battery. In order to prevent electrochemical contact between plunger 20 and the various fittings in the battery, it is advantageous to coat the plunger with a suitable protective film.

In the fabrication of a lithium battery in accordance with the invention, the initial step involves the preparation of the binary molybdenum chalcogenide, $Mo_6Se_6$. Molybdenum selenide is a known composition which may be prepared in accordance with conventional commercial methods. Thus, for example, $Mo_6Se_6$ may be synthesized by oxidation of $In_2Mo_2Se_6$ in a hydrogen chloride ambient at 450° C. Prior to use, the $Mo_6Se_6$ is baked in a vacuum to ensure the removal of gas molecules which may be trapped between particles.

The $Mo_6Se_6$ so obtained may then be used for the cathode 11 in the preparation of a structure of the type shown in FIG. 1, wherein lithium is used as the anode 13. Specifically, electrochemical swagelock test cells are prepared in a helium atmosphere using a lithium metal disk anode separated from a molybdenum selenide cathode by suitable porous glass paper soaked in an electrolyte such as 1 molar $LiAsF_2$ in 2 methyl tetrahydrofuran. The cells so obtained may then be observed to determine their behavior during discharge to various voltages as a function of the change in lithium atom content per formula unit of $Mo_6Se_6$.

Figure 2:
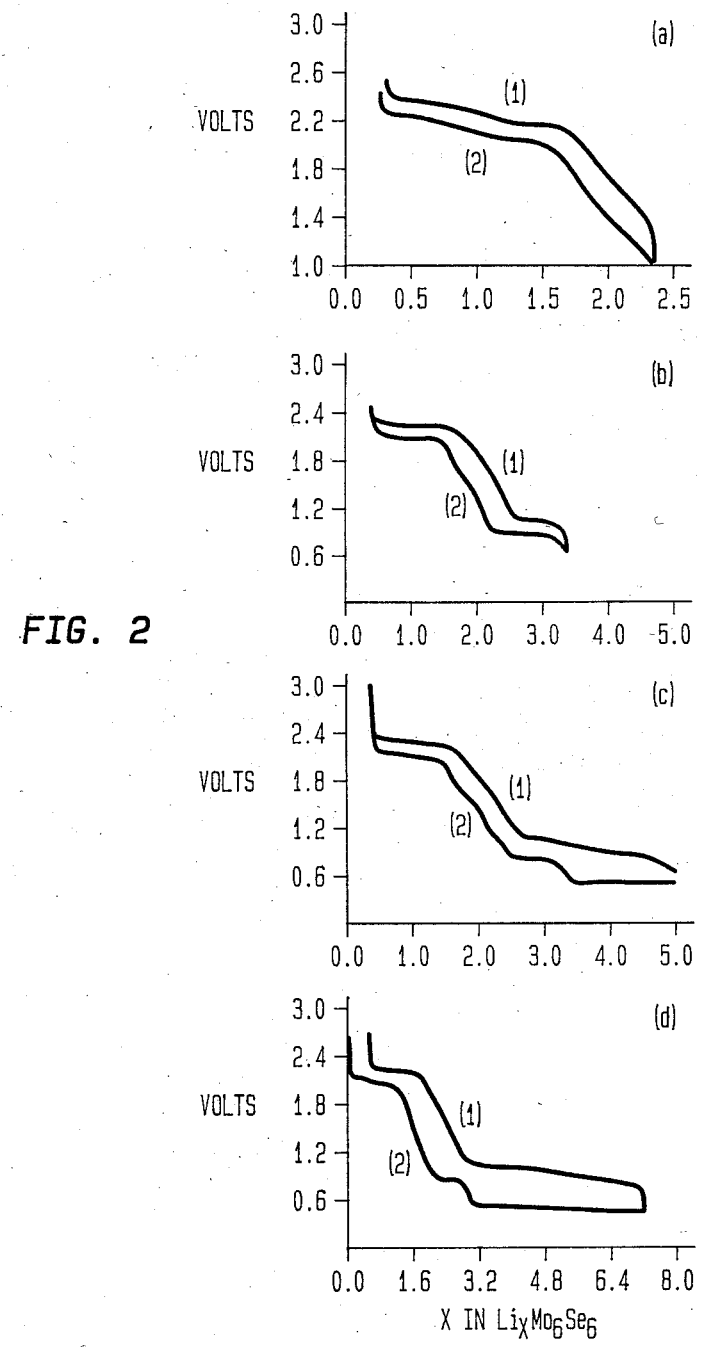

With reference now to FIG. 2(a), the discharge curve, designated (1), reveals that when discharge is initiated at 2.5 volts the lithium atom content in the formula $Li_xMo_6Se_6$ is 0.3. As discharge continues down to 1.0 volt, the amount of lithium used increases to 2.3 atoms per formula unit. Surprisingly, the cell upon recharging (Curve 2) is reversible and with a voltage of 2.4 volts the lithium content returns to 0.3 atoms per formula unit. Similar behavior is observed with the cells evaluated in FIGS. 2(b), 2(c) and 2(d) wherein discharge was effected from 2.42, 2.9 and 2.5 volts, respectively, to 0.6, 0.5 and 0.4 volts, respectively. It will be noted that the amount of lithium used, that is, lithium introduced into $Mo_6Se_6$ increases to 3.2, 5.0 and 7.0 atoms per formula unit in $Li_xMo_6Se_6$. Studies of multiple cycling of these cells revealed a loss in capacity of approximately 10% after the first cycle. However, recharging to 100% of capacity was effected for 15 cycles down to 1 volt, 10 cycles down to 0.6 volt and 2 cycles down to 0.5 volt.

The loss in capacity sustained after the first cycle is not unexpected since this behavior is frequently noted in secondary lithium cells. This is attributed to the presence of a small amount of intercalated lithium trapped by defects which remain in the structure after recharging the battery.

In order to further evaluate the reversibility of the $Li_xMo_6Se_6$ system at low potential, a cell after being cycled ten times from 2.7 to 0.6 volts was discharged to 0.25 volts and then recycled several times. FIG. 3 reveals that the cell recharged from 0.3 to 0.8 volt (cycle a) and discharged without losing its capacity. However, over subsequent cycles between 0.25 and 0.80 volt, designated first, second and third, a loss in capacity is noted. This behavior is attributed to electrolyte decomposition and/or reaction with cell containers normally encountered at these low potentials.

The following exemplary embodiment which is set forth solely for purposes of exposition, describes the characteristics of $Li_xMo_6Se_6/Mo_6Se_6$ cells.

EXAMPLE

The electrochemical behavior of a $Li_xMo_6Se_6/Mo_6Se_6$ cell was studied using 41 milligrams of $Mo_6Se_6$ (cathode) and 20 milligrams of $Li_6Mo_6Se_6$. The cell was cycled with a current density of 1 mA/cm² between 1.9 and 0.2 volt. The reversibility of the intercalation reaction was noted as well as a small loss in capacity after several cycles (10% after 10 cycles). However, the capacity is low since the narrow range of potential permits the $Mo_6Se_6$ to take up only 1.2 lithium atoms.

A larger discharge potential requires a lithiated phase with a greater lithium content. Thus, $Li_9Mo_6Se_6$ was obtained by discharging a $Li/Mo_6Se_6$ cell to 0.25 volt. Then, the cell was opened and the lithium replaced by fresh $Mo_6Se_6$. The resulting $Li_9Mo_6Se_6/Mo_6Se_6$ cell, containing equal amounts of cathode and anode material after charging and recharging behaves in the manner shown in FIG. 4. 22 Milligrams of $Li_9Mo_6Se_6$ and 22 milligrams of $Mo_6Se_6$ were employed, cycling being effected at a current density of 1 mA/cm². The ninth cycle (solid curve) and tenth cycle (dashed curve) are shown. The reversibility of the cell without significant loss in capacity on cycling enables $Li_xMo_6Se_6$ to be substituted for lithium as the anode in secondary lithium cells based on $Mo_6Se_6$. The loss in capacity is of particular interest since it is less than that measured after ten cycles with identical test cells using $TiS_2$ cathodes.

Based upon the foregoing, it is apparent that $Mo_6Se_6$ can be used as both the cathode and anode in secondary lithium cells, the $Mo_6Se_6$ being capable of accepting nine lithium atoms reversibly without adversely affecting its linear chain structure. This results in a theoretical volume density of about 1.1 Wh/cm³ compared to 1.2 for $TiS_2$. Accordingly, the practical utilization of non-aqueous secondary lithium cells is now attainable.

While the invention has been described in detail in the foregoing specification, the aforesaid is by way of illustration only and is not restrictive in character. It will be appreciated by those skilled in the art that the processing parameters may be varied without departing from the spirit and sense of the invention. Modifications which will readily suggest themselves to persons skilled in the art are all considered within the scope of the invention, reference being had to the appended claims.

What is claimed is:

1. A non-aqueous battery including a lithium anode, an electrolyte and a cathode, characterized in that said cathode comprises a molybdenum selenide of the formula $Mo_6Se_6$.

2. A battery in accordance with claim 1 wherein said electrolyte is $LiAsF_6$ in 2 methyl tetrahydrofuran.

3. A non-aqueous secondary lithium battery including a cathode, an electrolyte and an anode, the cathode and anode comprising $Li_xMo_6Se_6$ wherein x represents an integer ranging from 0.5 to 9.

4. A battery in accordance with claim 3 wherein x in the anode is 9.

5. A battery in accordance with claim 3 wherein the electrolyte is $LiAsF_6$ in 2 methyl tetrahydrofuran.

6. A non-aqueous battery including a cathode, an electrolyte and an anode of $Li_xMo_6Se_6$ wherein x is an integer ranging from 0.5 to 9.

* * * * *